US010097335B2

United States Patent
Lee et al.

(10) Patent No.: US 10,097,335 B2
(45) Date of Patent: Oct. 9, 2018

(54) METHOD FOR DETERMINING VALIDITY SIGNAL IN WIRELESS COMMUNICATION SYSTEM SUPPORTING USAGE CHANGE OF RADIO RESOURCE, AND APPARATUS THEREFOR

(71) Applicant: LG ELECTRONICS INC., Seoul (KR)

(72) Inventors: Seungmin Lee, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 15/122,803

(22) PCT Filed: Mar. 10, 2015

(86) PCT No.: PCT/KR2015/002296
§ 371 (c)(1),
(2) Date: Aug. 31, 2016

(87) PCT Pub. No.: WO2015/137698
PCT Pub. Date: Sep. 17, 2015

(65) Prior Publication Data
US 2017/0111159 A1  Apr. 20, 2017

Related U.S. Application Data

(60) Provisional application No. 61/950,811, filed on Mar. 10, 2014.

(51) Int. Cl.
*H04W 4/00* (2018.01)
*H04L 5/14* (2006.01)
(Continued)

(52) U.S. Cl.
CPC ............. *H04L 5/14* (2013.01); *H04L 1/1861* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2010/0254329 A1  10/2010  Pan et al.
2011/0268087 A1*  11/2011  Kwon ............... H04L 5/0005
370/331

(Continued)

FOREIGN PATENT DOCUMENTS

JP        2013-258785 A     12/2013
KR    10-2013-0054896 A      5/2013
(Continued)

OTHER PUBLICATIONS

NEC: "Remaining issues in TDD-FDD carrier aggregation system", R1-140485, 3GPP TSG RAN WG1 Meeting #76, Prague, Czech Republic, Feb. 10-14, 2014.

(Continued)

*Primary Examiner* — Zewdu A Beyen
(74) *Attorney, Agent, or Firm* — Dentons US LLP

(57) ABSTRACT

The present invention relates to a method and an apparatus for receiving, in a wireless communication system supporting carrier aggregation and usage change of a radio resource, a signal of a terminal which does not support simultaneous reception and transmission of aggregated cells. Specifically, the method comprises the steps of: receiving downlink control information for a secondary cell on a specific radio resource corresponding to a special subframe of a primary cell and a downlink subframe of the secondary cell; and
(Continued)

determining validity of the downlink control information according to an uplink-downlink setting of the primary cell, wherein the downlink control information is determined to be invalid if the primary cell is in non-fallback mode, and determined to be valid if the primary cell is a time division duplex (TDD) uplink-downlink setting according to fallback mode and the secondary cell is cross-carrier scheduled according to the primary cell.

7 Claims, 10 Drawing Sheets

(51) Int. Cl.
  *H04L 5/00* (2006.01)
  *H04L 1/18* (2006.01)
  *H04W 72/04* (2009.01)
  *H04W 72/12* (2009.01)

(52) U.S. Cl.
  CPC ..... *H04W 72/042* (2013.01); *H04W 72/0413* (2013.01); *H04W 72/0446* (2013.01); *H04W 72/0453* (2013.01); *H04W 72/1268* (2013.01); *H04W 72/1273* (2013.01)

(56) References Cited

U.S. PATENT DOCUMENTS

| | | | |
|---|---|---|---|
| 2013/0301564 A1 | 11/2013 | Chen et al. | |
| 2014/0133369 A1* | 5/2014 | Cheng | H04L 5/16 370/280 |
| 2014/0269460 A1* | 9/2014 | Papasakellariou | H04L 5/1469 370/294 |
| 2014/0307597 A1 | 10/2014 | Kim et al. | |
| 2015/0023231 A1 | 1/2015 | Ji et al. | |
| 2015/0092637 A1 | 4/2015 | Yang et al. | |
| 2015/0200752 A1* | 7/2015 | Yin | H04L 1/1887 370/280 |

FOREIGN PATENT DOCUMENTS

| | | |
|---|---|---|
| WO | 2013/129834 A1 | 9/2013 |
| WO | 2013/176531 A1 | 11/2013 |
| WO | 2013165160 A1 | 11/2013 |
| WO | 2013/192601 A2 | 12/2013 |

OTHER PUBLICATIONS

LG Electronics: "Remaining Details of HARQ Feedback for TDD eIMTA", R1-140299, 3GPP TSG RAN WG1 Meeting #76, Prague, Czech Republic, Feb. 10-14, 2014.

CATT: "Summary of email discussion [75-38] PUCCH for TDD eIMTA", R1-140070, 3GPP TSG RAN WG1 Meeting #76, Prague, Czech Republic, Feb. 10-14, 2014.

CATT: "PUSCH timing with TDD as PCell for FDD-TDD CA", 3GPP TSG RAN WG1 Meeting #74bis, R1-134096, Oct. 7-11, 2013.

Sharp: "Support of non simultaneous Rx/Tx capable UEs for TDD-FDD carrier aggregation", 3GPP TSG RAN WG1 Meeting #76, R1-140644, Feb. 10-14, 2014.

CATT: "PDSCH timing with TDD as PCell for FDD-TDD CA", 3GPP TSG RAN WG1 Meeting #74bis, R1-134095, Oct. 7-11, 2013.

International Search Report from PCT/KR2015/002296, dated Jun. 11, 2015.

Written Opinion of the ISA from PCT/KR2015/002296, dated Jun. 11, 2015.

Search Report of European Patent Office in Appl'n No. 15762192.1, dated Oct. 6, 2017.

Office Action of Japanese Patent Office in Appl'n No. 2016-570754, dated Sep. 12, 2017.

* cited by examiner

FIG. 2
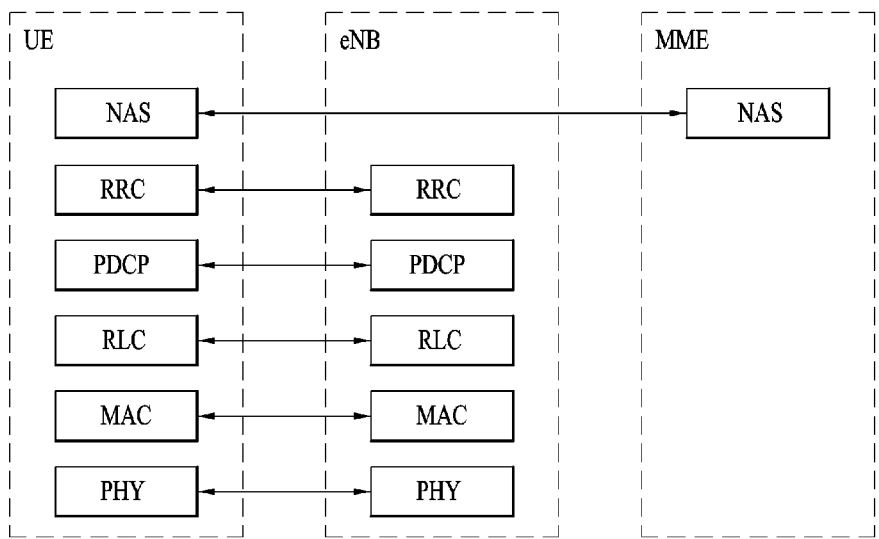
(a) Control-Plane Protocol Stack
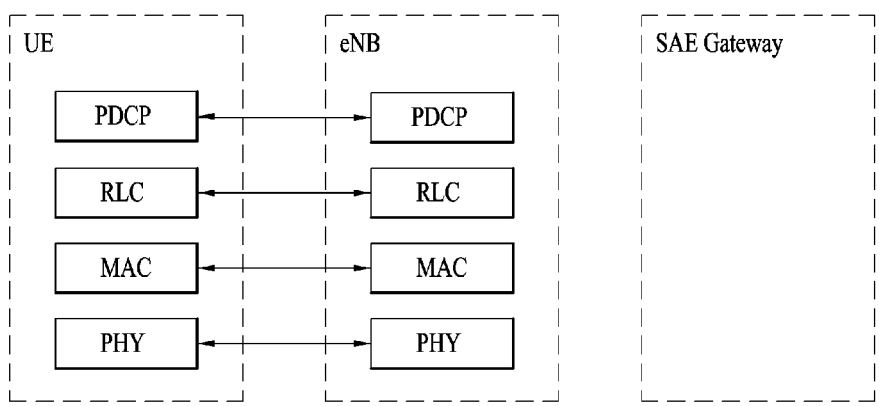
(b) User-Plane Protocol Stack

METHOD FOR DETERMINING VALIDITY SIGNAL IN WIRELESS COMMUNICATION SYSTEM SUPPORTING USAGE CHANGE OF RADIO RESOURCE, AND APPARATUS THEREFOR

This application is a National Stage Entry of International Application No. PCT/KR2015/002296 filed Mar. 10, 2015, which claims priority to U.S. Provisional Application No. 61/950,811 filed Mar. 10, 2014, both of which are incorporated by reference for all purposes as if fully set forth herein.

TECHNICAL FIELD

The present invention relates to a wireless communication system, and more particularly, to a method for determining validity of a signal in a wireless communication system supporting usage change of radio resources and an apparatus therefore.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The user equipment reports status information of a current channel to the base station periodically and/or non-periodically to assist the base station to efficiently manage the wireless communication system. Since the reported status information may include results calculated considering various statuses, more efficient reporting method will be required.

DISCLOSURE

Technical Problem

An object of the present invention devised to solve the problem lies in a method for determining validity of a signal in a wireless communication system supporting usage change of radio resources and an apparatus therefore.

The objectives and other advantages of the invention may be realized and attained by the structure particularly pointed out in the written description and claims hereof as well as the appended drawings.

Technical Solution

The object of the present invention can be achieved by providing a method for receiving a signal by a user equipment (UE) configured not to support simultaneous reception and transmission of aggregated cells in a wireless communication system supporting carrier aggregation and reconfiguration of a radio resource, the method including receiving, on a specific radio resource corresponding to a special subframe of a primary cell and a downlink subframe of a secondary cell, downlink control information about the secondary cell, and determining validation of the downlink control information according to an uplink-downlink configuration of the primary cell, wherein the downlink control information is determined to be invalid when the primary cell is in a non-fallback mode, and is determined to be valid when the primary cell corresponds to a TDD (Time Division Duplex) uplink-downlink configuration according to a fallback mode, and the secondary cell is subjected to cross-subcarrier scheduling according to the primary cell.

The method may further include receiving, when the downlink control information is determined to be valid, a physical downlink shared channel (PDSCH) on the specific radio resource.

The determining of the validation may be performed only when a physical downlink shared channel (PDSCH) is configured not to be received for a downlink subframe of a time interval identical to a time interval of the special subframe for the UE.

In another aspect of the present invention, provided herein is a user equipment (UE) configured not to support simultaneous reception and transmission of aggregated cells in a wireless communication system supporting carrier aggregation and reconfiguration of a radio resource, the UE including a radio frequency (RF) unit, and a processor, wherein the processor is configured to receive, on a specific radio resource corresponding to a special subframe of a primary cell and a downlink subframe of a secondary cell, downlink control information about the secondary cell, and determine validation of the downlink control information according to an uplink-downlink configuration of the primary cell, wherein the downlink control information may be determined to be invalid when the primary cell is in a non-fallback mode, and may be determined to be valid when the primary cell corresponds to a TDD (Time Division Duplex) uplink-downlink configuration according to a fallback mode, and the secondary cell is subjected to cross-subcarrier scheduling according to the primary cell.

In another aspect of the present invention, provided herein is a method for transmitting a signal by a user equipment (UE) configured not to support simultaneous reception and transmission of aggregated cells in a wireless communication system supporting carrier aggregation and reconfiguration of a radio resource, the method including receiving uplink control information about a secondary cell on a specific radio resource corresponding to a special subframe of a primary cell and a downlink subframe of the secondary cell, and determining validation of the uplink control information according to an uplink-downlink configuration of the primary cell, wherein the uplink control information is determined to be invalid when the primary cell is in a non-fallback mode, and is determined to be valid when the primary cell corresponds to a TDD (Time Division Duplex) uplink-downlink configuration according to a fallback mode, and usage of the specific radio resource is fixed.

When the usage of the radio resource is fixed, the radio resource corresponds to an uplink subframe of at least one of a downlink HARQ reference configuration, uplink HARQ reference configuration, SIB-based uplink-downlink configuration, uplink reference HARQ timeline and downlink-HARQ timeline.

The method may further include transmitting, when the uplink control information is determined to be valid, an uplink data channel (Physical Uplink Shared CHannel (PUSCH)) on the specific radio resource.

In another aspect of the present invention, provided herein is a method for transmitting a signal by a user equipment (UE) configured not to support simultaneous reception and transmission of aggregated cells in a wireless communication system supporting carrier aggregation and reconfiguration of a radio resource, the method including receiving a sounding reference signal (SRS) triggering message for a secondary cell on a specific radio resource corresponding to a special subframe of a primary cell and a downlink subframe of the secondary cell, and determining validation of the SRS triggering message according to an uplink-downlink configuration of the primary cell, wherein the SRS triggering message is determined to be invalid when the primary cell is in a non-fallback mode, and is determined to be valid when the primary cell corresponds to a TDD (Time Division Duplex) uplink-downlink configuration according to a fallback mode, and the specific radio resource is fixed to be used for uplink.

The SRS triggering message may be determined to be valid when an uplink data channel (Physical Uplink Shared CHannel (PUSCH)) and the SRS are scheduled simultaneously on the specific radio resource.

Advantageous Effects

According to an embodiment of the present invention, validity of signals may be efficiently determined in a wireless communication system supporting usage change of radio resources.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and E-UTRAN based on the 3GPP radio access network standard;

BEST MODE

Figure 1:
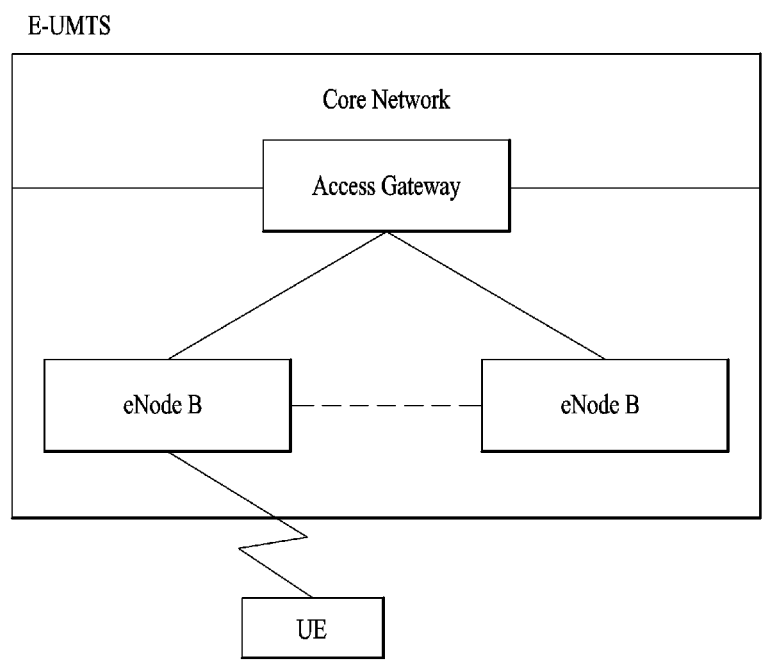
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
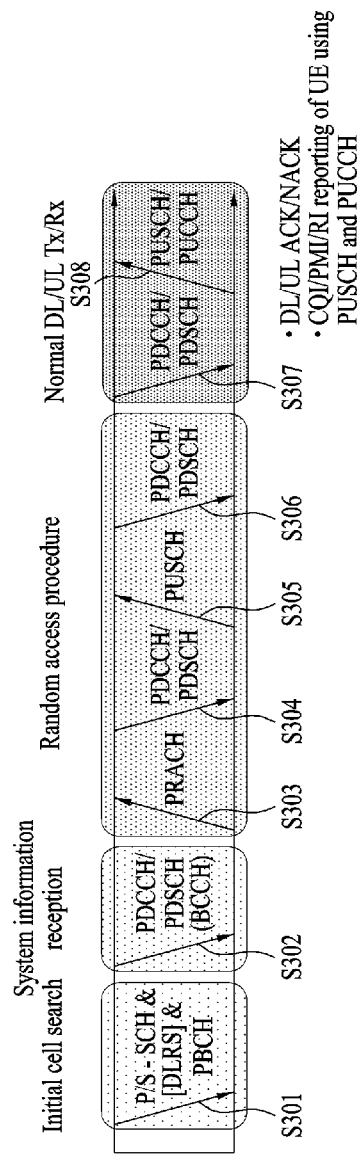
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc.

Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
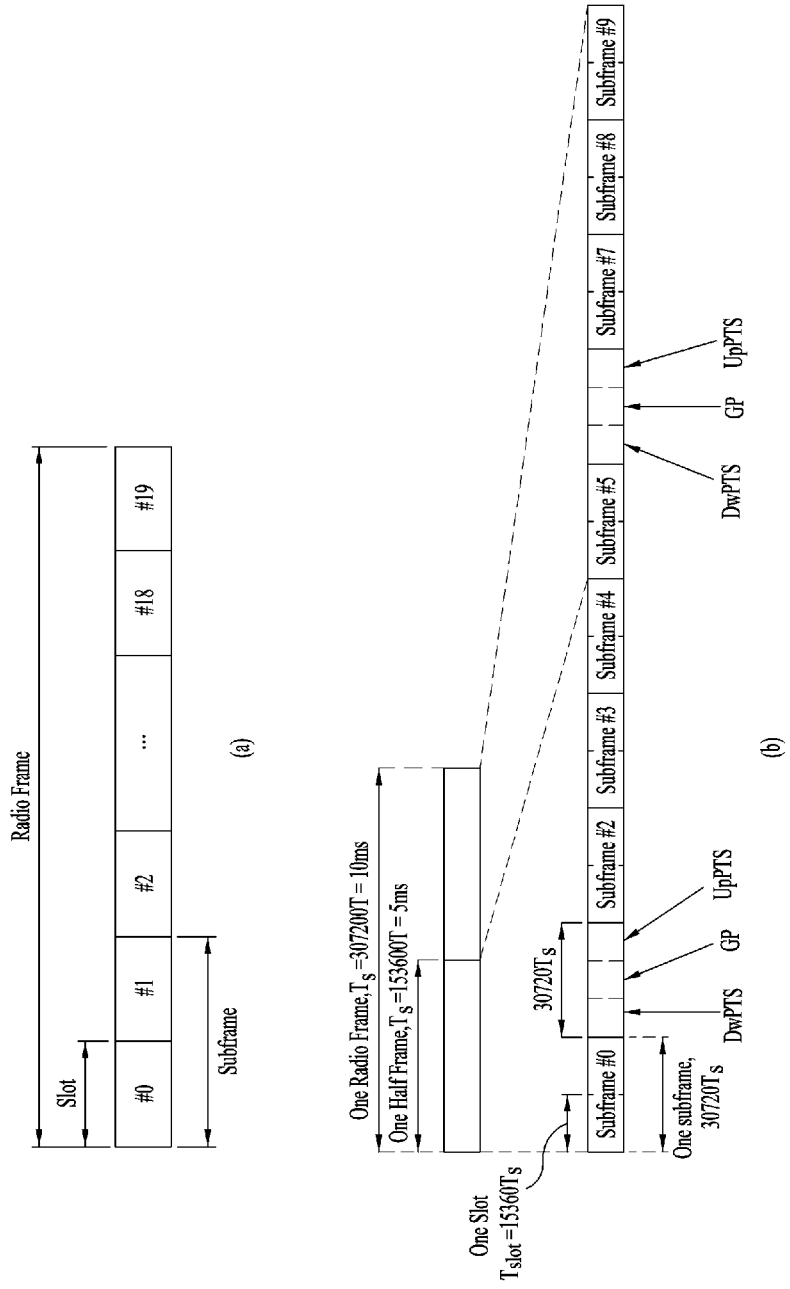
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
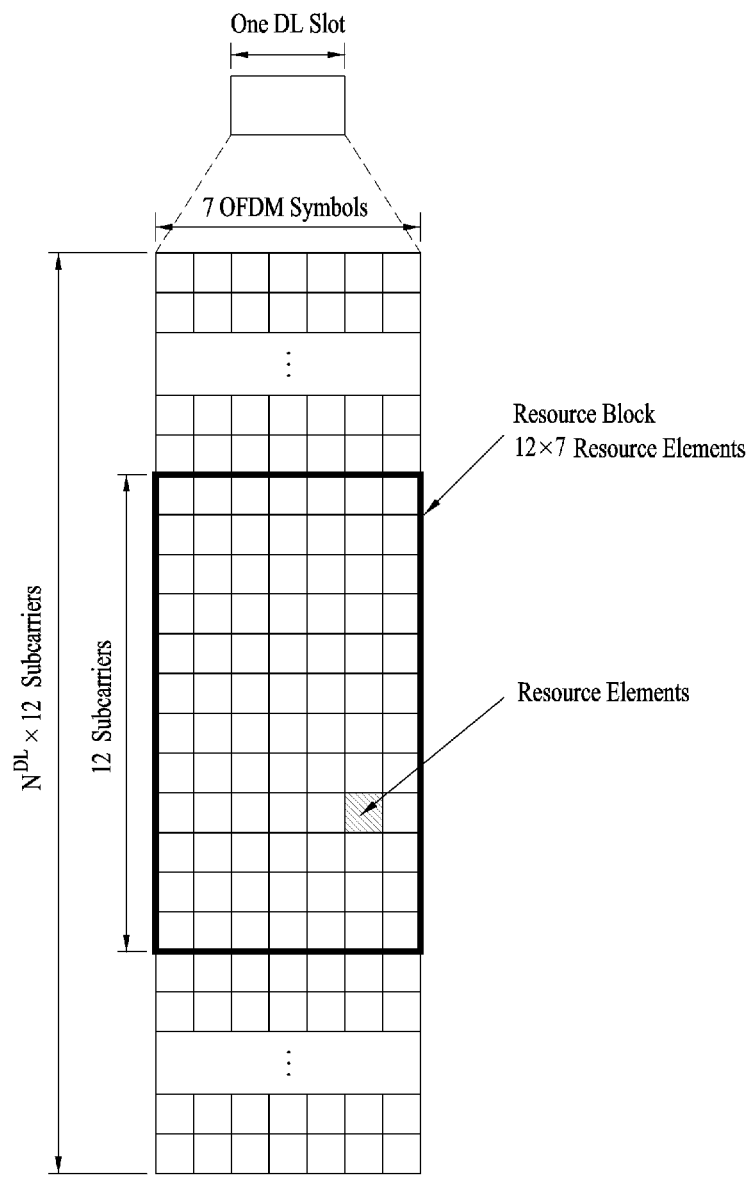
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{rb}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
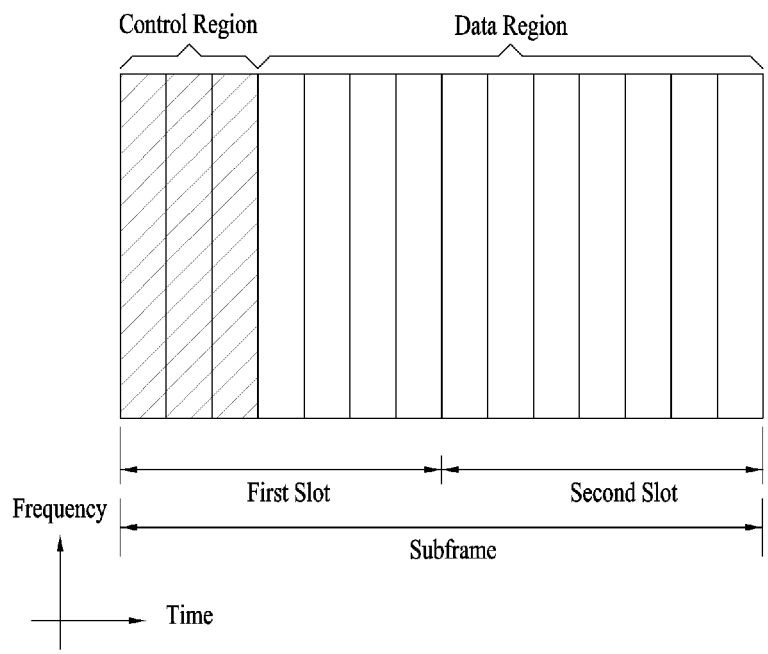
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
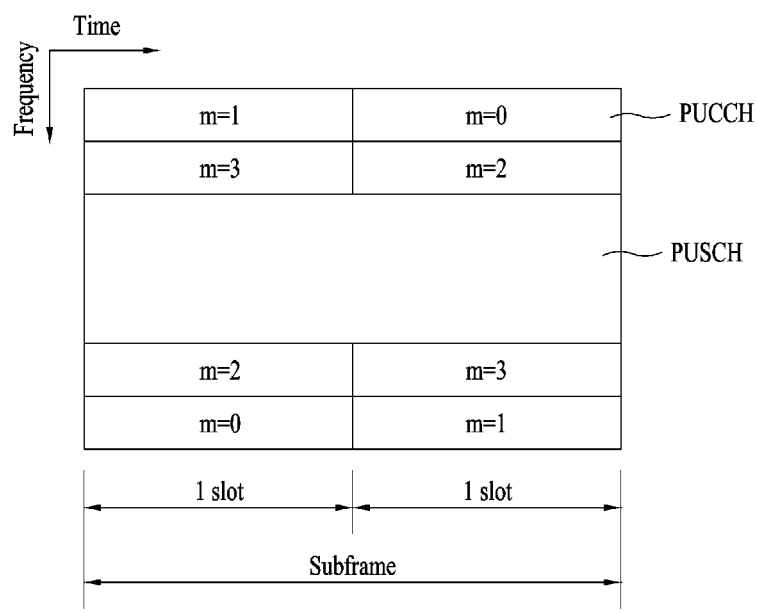
FIG. 7 illustrates the structure of an uplink subframe used in an LTE system.

FIG. 7 illustrates the structure of an uplink subframe used in LTE.

Referring to FIG. 7, an uplink (UL) subframe includes a plurality of (e.g., 2) slots. Each slot includes a different number of SC-FDMA symbols according to CP length. The UL subframe is divided into a data region and a control unit in the frequency domain. The data region includes a PUSCH and is used to transmit data signals such as voice. The control region includes a PUCCH and is used to transmit uplink control information (UCI). The PUCCH performs hopping across a slot boundary including an RB pair located at both ends of the data region in the frequency domain.

The PUCCH may be used to transmit control information described below.

Scheduling Request (SR): This is information used to request an uplink UL-SCH resource. This information is transmitted using an On-Off Keying (OOK) scheme.
  HARQ ACK/NACK: This is a response signal for a downlink data packet on the PDSCH. This indicates whether a downlink data packet has been successfully received. As a response to a single downlink codeword, 1-bit ACK/NACK is transmitted. As a response to two downlink codewords, 2-bit ACK/NACK is transmitted.

Channel State Information (CSI): This is feedback information about a downlink channel. The CSI includes a channel quality indicator (CQI), and feedback information related to Multiple Input Multiple Output (MIMO) includes a rank indicator (RIA), a precoding matrix indicator (PMI), and a precoding type indicator (PTI). This information uses 20 bits per subframe.

The amount of UCI transmittable by a UE in a subframe depends on the number of SC-FDMAs available for transmission of the UCI. The SC-FDMAs available for transmission of the UCI refers to SC-FDMA symbols other than SC-FDMA symbols for transmission of a reference signal in a subframe. For a subframe in which a sounding reference signal (SRS) is configured, the last SC-FDMA symbol of the subframe is also excluded from the available symbols. The reference signal is used for coherent detection of the PUCCH.

Figure 8:
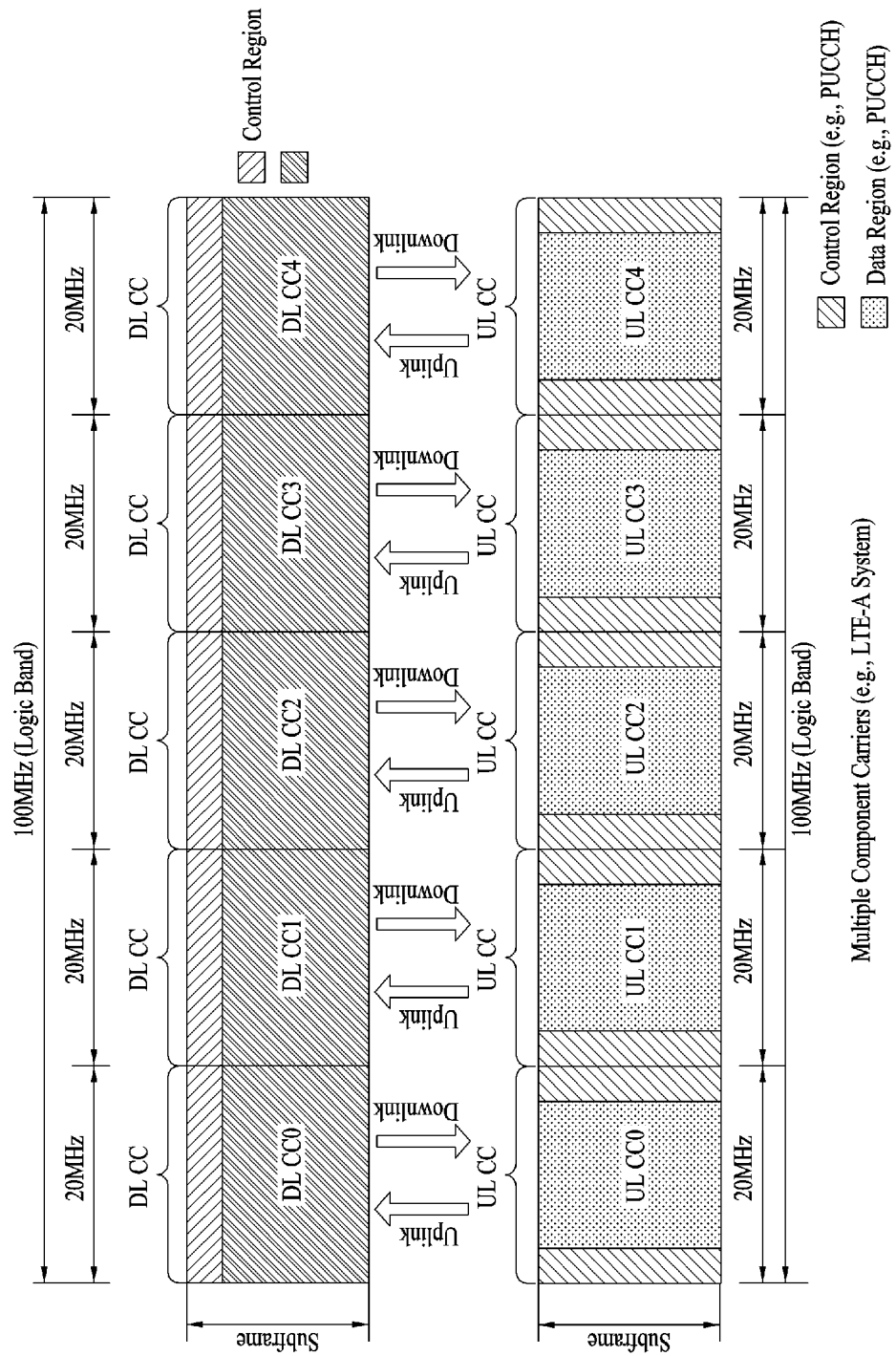
FIG. 8 illustrates a carrier aggregation (CA) communication system.

FIG. 8 illustrates a carrier aggregation (CA) communication system.

Referring to FIG. 8, a plurality of UL/DL component carriers (CCs) may be collected to support a wider UL/DL bandwidth. The term "component carrier (CC)" may be replaced with another equivalent term (e.g., carrier, cell, etc.). CCs may or may not be adjacent to each other in the frequency domain. The bandwidth of each CC may be independently determined. Asymmetric carrier aggregation in which the number of UL CCs differs from that of DL CCs is also possible. Meanwhile, control information may be configured to be transmitted and received through a specific CC. This specific CC may be referred to as a primary CC (or an anchor CC), and the other CCs may be referred to as secondary CCs.

When cross-carrier scheduling (or cross-CC scheduling) is applied, a PDCCH for DL assignment may be transmitted on DL CC#0, and a corresponding PDSCH may be transmitted on DL CC#2. To ensure cross-CC scheduling, a carrier indicator field (CIF) may be introduced. In the PDCCH, presence of CIF may be semi-statically and UE-specifically (or UE group-specifically) indicated through higher layer signaling (e.g., RRC signaling). A baseline for PDCCH transmission is summarized below.

CIF Disabled: A PDCCH on a DL CC is assigned a PDSCH resource on the same DL CC or a PUSCH resource on one linked UL CC.
No CIF
Identical to LTE PDCCH structure (the same coding, same CCE-based resource mapping) and DCI format
CIF Enabled: A PDCCH on a DL CC can be assigned a PDSCH or PUSCH resource on a specific DL/UL CC among a plurality of aggregated DL/UL CCs, using a CIF
An extended LTE DCI format having a CIF
The CIF (when configured) is a fixed x-bit field (e.g., x=3)
The location of the CIF (when configured) is fixed irrespective of the size of the DCI format.
Reusing the LTE PDCCH structure (the same coding and same CCE-based resource mapping)

When a CIF is present, a base station may assign a PDCCH monitoring DL CC set to lower BD complexity on the UE. The PDCCH monitoring DL CC set includes at least one DL CC which is a part of all aggregated DL CCs, and the UE detects/decodes a PDCCH only on the at least one DL CC. That is, if the base station schedules a PDSCH/ PUSCH for the UE, the PDCCH is transmitted through only the PDCCH monitoring DL CC set. The PDCCH monitoring DL CC set may be configured in a UE-specific, UE-group-specific or cell-specific manner. The term "PDCCH monitoring DL CC" may be replaced with another equivalent term such as "monitoring carrier" and "monitoring cell". In addition, a CC aggregated for the UE may be expressed as an equivalent term such as "serving CC," "serving carrier," and "serving cell".

Figure 9:
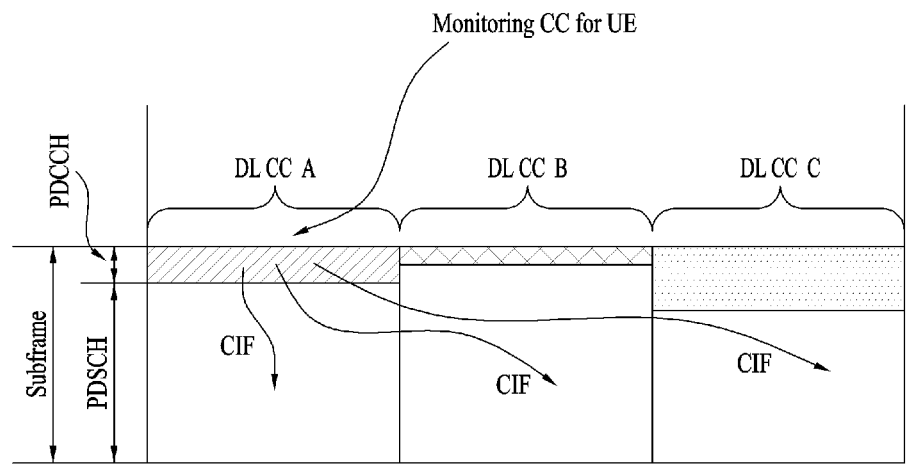
FIG. 9 illustrates scheduling performed when a plurality of carriers is aggregated.

FIG. 9 illustrates a scheduling operation in the case where a plurality of carriers is aggregated. It is assumed that 3 DL CCs have been aggregated. It is also assumed that DL CC A is configured as a PDCCH monitoring DL CC. DL CCs A to C may be referred to as serving CCs, serving carriers, serving cells, or the like. If the CIF is disabled, each DL CC may transmit only a PDCCH for scheduling the PDSCH thereof without a CIF according to the LTE PDCCH configuration. On the other hand, if the CIF is enabled by UE-specific (or UE-group-specific or cell-specific) higher layer signaling, not only a PDCCH for scheduling the PDSCH of DL CC A but also a PDCCH for scheduling the PDSCH of another CC may be transmitted on DL CC A (a monitoring DL CC) using the CIF. In this case, a PDCCH is not transmitted on DL CC B/C, which is not configured as a PDCCH monitoring DL CC. Accordingly, DL CC A (a monitoring DL CC) must include a PDCCH search space related to DL CC A, a PDCCH search space related to DL CC B and a PDCCH search space related to DL CC C. In this specification, it is assumed that a PDCCH search space is defined for each carrier.

As described above, LTE-A considers using the CIF in a PDCCH to perform cross-CC scheduling. Whether the CIF is used (namely, a cross-CC scheduling mode or non-cross-CC scheduling mode is supported) and switching between the modes may be semi-statically/UE-specifically configured through RRC signaling. After being subjected to the RRC signaling process, the UE may recognize whether the CIF is used in a PDCCH that is to be scheduled therefore.

Figure 10:
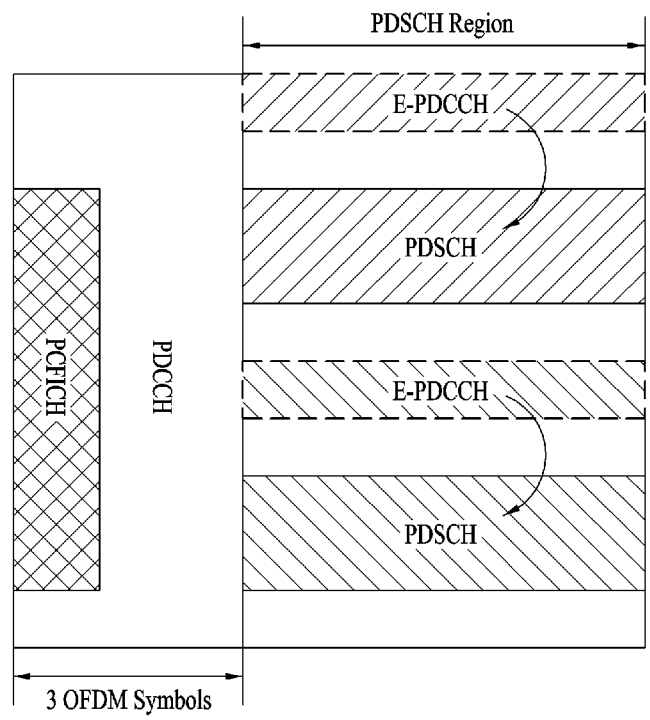
FIG. 10 illustrates an EPDCCH and a PDSCH scheduled by the EPDCCH.

FIG. 10 illustrates an EPDCCH and a PDSCH scheduled by the EPDCCH.

Referring to FIG. 10, for the EPDCCH, a part of the PDSCH region for transmitting data may be generally defined and used. A UE must perform blind decoding to detect presence of an EPDCCH thereof. The EPDCCH performs the same scheduling operation (i.e., controlling a PDSCH and a PUSCH) as performed by the legacy PDCCH, but may increase complexity when the number of UEs accessing a node such as the RRH since the number of EPDCCHs assigned in the PDSCH region increases and thus the number of times of blind decoding which a UE needs to perform increases.

Figure 11:
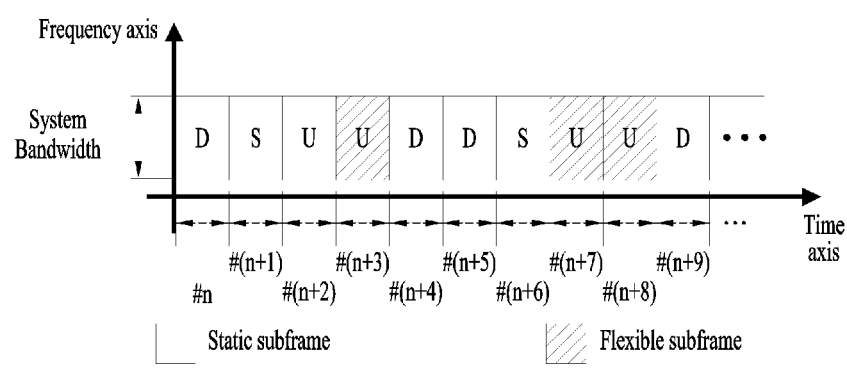
FIG. 11 illustrates division of (legacy) subframes into a static subframe set and a flexible subframe set in a TDD system environment.

FIG. 11 illustrates division of (legacy) subframes into a static subframe set and a flexible subframe set in a TDD system environment. In the example of FIG. 8, a legacy UL-DL configuration established through a system information block (SIB) signal is assumed to be UL-DL configuration #1 (i.e., DSUUDDSUUD), and an eNB is assumed to announce reconfiguration information about radio resources to a UE through a predefined signal.

The radio resource reconfiguration message is used to signal usages of radio resources appearing i) at and after the time at which the reconfiguration message is received, ii) after the time at which the reconfiguration message is received, or iii) when a predefined time (i.e., a subframe offset) passes after the time at which the reconfiguration message is received, according to a predefined rule.

Accordingly, there is a need for clear definition of a method for transmitting/receiving a reconfiguration message with a high success probability or a UL-DL configuration (i.e., the fallback operation for the UL-DL configuration) assumed by a specific UE when the UE fails to successfully receive the reconfiguration message to ensure stable downlink/uplink communication of a system and stable derivation and reporting of channel state information (CSI) in the UE. Herein, the UE may fail to successfully receive the reconfiguration message when, for example, the result of cyclic redundancy check (CRC) for the received reconfiguration message turns out to be False, or the UE misses the reconfiguration message (e.g., the UE misses the reconfiguration message due to the DRX operation).

Based on the description above, this embodiment proposes a method for efficiently determining validation of transmission of a downlink (DL)/uplink (UL) signal when configuration of a radio resource in a specific cell (hereinafter, eIMTA Cell) dynamically changes according to the state of load in a situation in which carrier aggregation (CA) is adopted. Herein, the reconfiguration message may be transmitted in the form of a higher layer signal (e.g., SIB/PBCH/MAC/RRC) or physical layer signal (e.g., PDCCH/EPDCCH/PDSCH) in a predefined cell (e.g. Primary Cell (PCell)). The reconfiguration message may be UE-specific, cell-specific, UE-group-specific, or UE-group-common. Additionally, the reconfiguration message may be transmitted in a predefined cell (e.g., PCell) through a UE-specific search space (USS) or a common search space (CSS).

Hereinafter, for simplicity, the present invention will be described based on the 3GPP LTE system. However, the proposed method is also applicable to systems other than the 3GPP LTE system.

If a UE fails to successfully receive a reconfiguration message related to a cell (e.g., TDD eIMTA Cell) to which dynamic change of configuration of radio resources is applied, at least one of i) CSI measurement, ii) monitoring of a downlink control channel (PDCCH), iii) reception of a downlink data channel (PDSCH) and iv) transmission of an uplink data channel (PUSCH) may be performed based on a UL-DL configuration on SIB1.

When the UE decodes explicit L1 signaling for reconfiguration and detects a valid UL-DL configuration, the UE measures CSI only in subframes indicated as downlink subframes or special subframes through explicit L1 signaling. If the UE fails to detect L1 signaling for delivering a valid UL-DL configuration for a radio frame, the UE may measure CSI only in subframes indicated as downlink subframes or special frames according to the SIB configuration.

Regarding reception of PDCCH or PDSCH, when the UE detects L1 signaling for delivering a valid UL-DL configuration for a radio frame, the UE monitors a non-DRX downlink subframe or special subframe indicated by the explicit L1 signaling. If the UE fails to detect L1 signaling for delivering a valid UL-DL configuration for a radio frame, the UE monitors a non-DRX downlink subframe or special subframe for PDCCH or EPDCCH indicated by SIB-1 configuration.

Herein, regarding the valid UL-DL configuration, a DL HARQ reference configuration may be selected from Rel-8 TDD UL-DL configurations {2, 4, 5}. For a UE for which TDD eIMTA (Further Enhancements to LTE Time Division Duplex (TDD) for Downlink-Uplink Interference Management and Traffic Adaptation) is configured, UL scheduling timing and HARQ timing conform to a UL-DL configuration signaled through SIB1. Under the condition of a valid UL HARQ reference configuration or DL HARQ reference configuration, the UE may consider that a UL subframe or special subframe in the DL HARQ reference configuration is not dynamically used as a downlink subframe or that a subframe or special subframe in the UL HARQ reference configuration is not dynamically used as a UL subframe.

Hereinafter, UL grant validation will be described. In the fallback mode, if the UE receives a UL grant which does not belong to a set of UL subframes for a DL HARQ reference configuration, but corresponds to at least one UL subframe for SIB1, the UL may determine that the UL grant is valid control information (valid grant). On the other hand, if the UE receives NACK on PHICH which does not belong to a set of UL subframes for a DL HARQ reference configuration, but triggers PUSCH transmission in a UL subframe for SIB1, the UE transmits the PUSCH. When SRS transmission validation is triggered, a subframe in which transmission of a Type 1 SRS is arranged is determined based on SIB1. For all SRSs of Type 0 or Type 1, SRS transmission may be configured in a UL subframe or SIB1-based UpPTS.

That is, the operations of items i) to iv) described above may be referred to as a "fallback operation" (or "fallback mode"). Through the operations, a BS may minimize i) damage to communication between a UE and the BS (or communication between a legacy UE and the BS) caused by interference resulting from erroneous operation of a UE which has failed to successfully receive a reconfiguration message (e.g., transmission of an incorrect UL data channel (PUSCH) and/or UL control channel (PUCCH) due to false detection of a control channel (PDCCH/EPDCCH)) or ii) DL HARQ buffer operation errors (e.g., DL HARQ buffer corruption) of the UE which has failed to successfully receive a reconfiguration message.

When CA is applied to cells having different UL-DL configurations, and a UE fails to perform simultaneous reception (RX) and transmission (TX) in these cells, transmission/reception of a UL/DL signal is defined to be performed based on the constraints given in Table 3 below.

TABLE 3

In case multiple cells with different uplink-downlink configurations are aggregated and the UE is not capable of simultaneous reception and transmission in the aggregated cells, the following constraints apply:
  If the subframe in the primary cell is a downlink subframe, the UE shall not transmit any signal or channel on a secondary cell in the same subframe
  If the subframe in the primary cell is an uplink subframe, the UE is not expected to receive any downlink transmissions on a secondary cell in the same subframe
  If the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

Hereinafter, a description will be given of a method for determining validation of control information (DL grant) related to DL data channel (PDSCH) scheduling when usage of a radio resource in a specific cell (i.e., eIMTA Cell) changes dynamically according to the state of load, and a UE fails to perform simultaneous TX and RX in the aggregated cells in a situation where CA is adopted. For simplicity, it is assumed in the following description that two cells are subjected to CA. However, it is apparent to those skilled in the art that the present invention is also applicable to a situation where three or more cells are subjected to CA.

Method 1 of the present invention may be used in a case where a TDD eIMTA PCell and a TDD (eIMTA or Non-eIMTA) SCell are subjected to CA and the TDD eIMTA PCell is operated in the fallback mode (namely, SIB1 UL-DL configuration) or in a case where the TDD eIMTA PCell and the TDD (eIMTA or Non-eIMTA) SCell are subjected to CA and the TDD eIMTA PCell is operated in the non-fallback mode.

Method 1

When a TDD eIMTA PCell and a FDD SCell (i.e., FDD UL CC, FDD DL CC) are subjected to CA, and the TDD eIMTA PCell is operated in the fallback mode (i.e., SIB1 UL-DL configuration), validation of scheduling information (DL grant) related to transmission of a DL data channel (PDSCH) in the FDD SCell may be determined based on Rule 1-A to Rule 1-O disclosed below.

Rule 1-A to Rule 1-O may be defined to be applied only when special subframe configurations related to SIB1 UL-DL configuration of the TDD eIMTA PCell are designated as at least one of i) Special Subframe Configuration 0 (w/Normal Downlink CP), ii) Special Subframe Configuration 5 (w/Normal Downlink CP), iii) Special Subframe Configuration 0 (w/Extended Downlink CP), or iv) Special Subframe Configuration 4 (w/Extended Downlink CP) (namely, when the special subframe configurations are interpreted as "No PDSCH Transmission in DwPTS" according to Table 3).

First, Method 1 may be used when a special subframe (special SF; hereinafter, S SF) on SIB1 UL-DL configuration based on the fallback mode of the TDD eIMTA PCell overlaps a DL SF on the FDD DL CC.

For cross carrier scheduling (CCS), Rule 1-A or Rule 1-B may be applied if a UE receives, at the position of a corresponding SF (i.e., the position at which an S SF on SIB1 UL-DL configuration based on the fallback mode of the TDD eIMTA PCell overlaps a DL SF on the FDD DL CC), a DL grant for scheduling a PDSCH on an FDD DL CC in the S SF of the TDD eIMTA PCell.

Rule 1-A: the UE may determine that the DL grant is invalid and thus may not perform PDSCH reception at the corresponding SF position on the FDD DL CC. This is intended to prevent erroneous operation of the UE according to false detection of the DL grant. That is, Rule 1-A may be interpreted as meaning that the UE does not expect to receive signals such as PDSCH/EPDCCH/PMCH/PRS at the corresponding SF position on the FDD DL CC. In other words, it may be determined that the UE does not expect to receive any other signals in an SF region of the FDD DL CC that overlaps at least one of the Guard Period (GP) and UpPTS of the TDD eIMTA PCell.

Rule 1-B: the UE may determine that the DL grant is valid and thus perform PDSCH reception at the corresponding SF position on the FDD DL CC. That is, according to Rule 1-B, it may be determined that the UE expects to receive signals such as PDSCH/EPDCCH/PMCH/PRS at the corresponding SF position on the FDD DL CC. In other words, it may be determined that the UE expects to receive predefined DL signals in the SF region of the FDD DL CC that overlaps at least one of the GP and UpPTS of the TDD eIMTA PCell (or the UE may be interpreted as considering that the SF at the corresponding position on the FDD DL CC is a DL SF).

For self-scheduling, Rule 1-C or Rule 1-D disclosed below may be applied if the UE receives a DL grant for scheduling PDSCH on the FDD DL CC in the PDCCH region on the FDD DL CC, or receives a DL grant for scheduling PDSCH on the FDD DL CC in a PDCCH region at a position where the PDCCH region overlaps the DwPTS region of the S SF of the TDD eIMTA PCell.

Rule 1-C: the UE may determine that the DL grant is invalid an thus may not perform PDSCH reception at the corresponding SF position on the FDD DL CC. That is, according to Rule 1-A, it may be determined that the UE does not expect to receive signals such as PDSCH/EPDCCH/PMCH/PRS at the corresponding SF position on the FDD DL CC. In other words, it may be determined that the UE does not expect to receive any other signals in an SF region of the FDD DL CC that overlaps at least one of the GP and UpPTS of the TDD eIMTA PCell.

Rule 1-D: the UE may determine that the DL grant is valid and thus perform PDSCH reception at the corresponding SF position on the FDD DL CC. That is, according to Rule 1-B, it may be determined that the UE does not expect to receive signals such as PDSCH/EPDCCH/PMCH/PRS at the corresponding SF position on the FDD DL CC. In other words, it may be determined that the UE expects to receive predefined DL signals in the SF region of the FDD DL CC that overlaps at least one of the GP and UpPTS of the TDD eIMTA PCell (or the UE may be interpreted as considering that the SF at the corresponding position on the FDD DL CC is a DL SF).

At least one of Rule 1-A, Rule 1-B, Rule 1-C and Rule 1-D may also be applied to a case where an S SF on an actual UL-DL configuration (or valid UL-DL configuration) based on the non-fallback mode of the TDD eIMTA PCell overlaps a DL SF on the FDD DL CC.

The assumption for reception of a DL signal/channel of the UE according to special subframe configurations in the TDD system environment is shown in Tables 1 and 2 given above and Table 4 (see 3GPP TS 36.213 of LTE/LTE-A standard document) below.

TABLE 4

7.1.7 Modulation order and transport block size determination

To determine the modulation order and transport block size(s) in the physical downlink shared channel, the UE shall first
    read the 5-bit "modulation and coding scheme" field ($I_{MCS}$) in the DCI
and second if the DCI CRC is scrambled by P-RNTI, RA-RNTI, or SI-RNTI then
    for DCI format 1A:
        set the Table 7.1.7.2.1-1 column indicator $N_{PRB}$ to $N_{PRB}^{1A}$ from subclause 5.3.3.1.3 in [4]
    for DCI format 1C:

TABLE 4-continued 7.1.7 Modulation order and transport block size determination use Table 7.1.7.2.3-1 for determining its transport block size.
else
   set $N_{PRB}'$ to the total number of allocated PRBs based on the procedure defined in subclause 7.1.6.
   if the transport block is transmitted in DwPTS of the special subframe in frame structure type 2, then
     for special subframe configuration 9 with normal cyclic prefix or special subframe configuration 7 with
     extended cyclic prefix:
       set the Table 7.1.7.2.1-1 column indicator $N_{PRB} = \max \{\lfloor N_{PRB}' \times 0.375 \rfloor, 1\}$
     for other special subframe configurations:
       set the Table 7.1.7.2.1-1 column indicator $N_{PRB} = \max \{\lfloor N_{PRB}' \times 0.75 \rfloor, 1\}$,
   else, set the Table 7.1.7.2.1-1 column indicator $N_{PRB} = N_{PRB}'$.
The UE may skip decoding a transport block in an initial transmission if the effective channel code rate is higher than
0.931, where the effective channel code rate is defined as the number of downlink information bits (including CRC bits)
divided by the number of physical channel bits on PDSCH. If the UE skips decoding, the physical layer indicates to
higher layer that the transport block is not successfully decoded. For the special subframe configurations 0 and 5 with
normal downlink CP or configurations 0 and 4 with extended downlink CP, shown in Table 4.2-1 of [3], there shall be
no PDSCH transmission in DwPTS of the special subframe.

Method 2

According to Method 2, when the TDD eIMTA cell (i.e., non-CA) is operated in the fallback mode (i.e., SIB1 UL-DL configuration), validation of scheduling information (DL grant) related to transmission of a DL data channel (PDSCH) in the corresponding TDD eIMTA may be determined according to Rule 2-A or Rule 2-B disclosed below.

For example, Rule 2-A or Rule 2-B may be defined to be applied only when special subframe configurations related to SIB1 UL-DL configuration are designated as at least one of i) Special Subframe Configuration 0 (w/Normal Downlink CP) ii) Special Subframe Configuration 5 (w/Normal Downlink CP), iii) Special Subframe Configuration 0 (w/Extended Downlink CP), or iv) Special Subframe Configuration 4 (w/Extended Downlink CP) (namely, when the special subframe configurations are interpreted as "No PDSCH Transmission in DwPTS"). Thereby, degradation of DL performance according to the fallback mode may be prevented.

Rule 2-A or Rule 2-B disclosed below may be applied if the UE receives, at a corresponding (overlapping) SF position, a DL grant for scheduling a PDSCH in a special SF of the TDD eIMTA Cell when, for example, i) a special SF on SIB1 UL-DL configuration based on the fallback mode of the TDD eIMTA Cell overlaps a DL SF on a (preconfigured) DL HARQ reference configuration, ii) the special SF on SIB1 UL-DL configuration based on the fallback mode of the TDD eIMTA Cell overlaps a previous actual UL-DL configuration, or iii) the special SF on SIB1 UL-DL configuration based on the fallback mode of the TDD eIMTA Cell overlaps a DL SF on one of previous valid UL-DL configurations.

Rule 2-A: the UE may determine that the DL grant is invalid and thus may not perform PDSCH reception at the corresponding SF position.

Rule 2-B: the UE may determine that the DL grant is valid and thus perform PDSCH reception at the corresponding SF position (or the UE may be interpreted as considering that the SF at the corresponding position is a DL SF).

Hereinafter, a description will be given of a method for determining validation of control information (UL grant) related to UL data channel (PUSCH) scheduling when usage of a radio resource in a specific cell (i.e., eIMTA Cell) changes dynamically according to the state of load, and a UE fails to perform simultaneous TX and RX in the aggregated cells in a situation where CA is adopted.

For simplicity, it is assumed in the following description that two cells are subjected to CA. However, it is apparent to those skilled in the art that the present invention is also applicable to a situation where three or more cells are subjected to CA.

Method 3 disclosed below may be used in i) a case where a TDD eIMTA PCell and a TDD (eIMTA or Non-eIMTA) SCell are subjected to CA and the TDD eIMTA PCell is operated in the fallback mode (namely, SIB1 UL-DL configuration) or in ii) a case where the TDD eIMTA PCell and the TDD (eIMTA or Non-eIMTA) SCell are subjected to CA and the TDD eIMTA PCell is operated in the non-fallback mode.

Method 3

When a TDD eIMTA PCell and an FDD SCell (i.e., FDD UL CC, FDD DL CC) are subjected to CA, and the TDD eIMTA PCell is operated in the fallback mode (i.e., SIB1 UL-DL configuration), validation of scheduling information (UL grant) related to transmission of a UL data channel (PUSCH) in the FDD SCell may be determined based on Rule 3-A to Rule 3-D disclosed below.

Rule 3-A to Rule 3-D adopted for cross carrier scheduling (CCS) or self-scheduling are described below.

Rule 3-A: validation of a corresponding UL grant may be determined depending on whether PUSCH transmission (on an FDD UL CC) needs to be performed at a point identical to a UL SF position according to at least one of i) DL HARQ reference configuration, ii) UL HARQ reference configuration, iii) SIB1 UL-DL configuration and iv) UL-reference HARQ timeline and v) DL-reference HARQ timeline of the TDD eIMTA PCell.

Specifically, if PUSCH transmission on the corresponding FDD UL CC needs to be performed at a point identical to a UL SF position according to at least one of i) the DL HARQ reference configuration, ii) UL HARQ reference configuration, iii) SIB1 UL-DL configuration, iv) UL-reference HARQ timeline, and v) DL-reference HARQ timeline of the TDD eIMTA PCell, the UE may determine that the UL grant is valid. On the other hand, if the point is not identical to any of positions i) to vi), the UE may determine that the UL grant is invalid.

Rule 3-B: the UE may determine that the DL grant is (always) invalid and thus may not perform PUSCH transmission on the FDD UL CC.

Rule 3-C: the UE may determine that the DL grant is (always) valid and thus perform PUSCH transmission on the FDD UL CC.

In addition, when a TDD eIMTA PCell and an FDD SCell (i.e., FDD UL CC, FDD DL CC) are subjected to CA, and the TDD eIMTA PCell is operated in the non-fallback mode (i.e., actual-DL configuration (or valid UL-DL configuration)), validation of scheduling information (UL grant) related to transmission of a UL data channel (PUSCH) in the FDD SCell may be determined based on Rule 3-D.

Rule 3-D: if PUSCH transmission (on an FDD UL CC) needs to be performed at a point identical to a UL SF position according to at least one of i) actual UL-DL configuration, ii) DL HARQ reference configuration, iii) UL HARQ reference configuration, iv) SIB1 UL-DL configuration, v) UL-reference HARQ timeline and vi) DL-reference HARQ timeline of the TDD eIMTA PCell, the UE may determine that the UL grant is valid. On the other hand, if the point is not identical to any of positions i) to vi), the UE may determine that the UL grant is invalid.

Hereinafter, a description will be given of a method for determining validation of a triggering message (e.g., UL grant or DL grant) related to aperiodic SRS (A-SRS) transmission when usage of a radio resource in a specific cell (i.e., eIMTA Cell) changes dynamically according to the state of load, and a UE fails to perform simultaneous TX and RX in the aggregated cells in a situation where CA is adopted.

For simplicity, it is assumed in the following description that two cells are subjected to CA. However, it is apparent to those skilled in the art that the present invention is also applicable to a situation where three or more cells are subjected to CA.

Method 4 disclosed below may be used in i) a case where a TDD eIMTA PCell and a TDD (eIMTA or Non-eIMTA) SCell are subjected to CA and the TDD eIMTA PCell is operated in the fallback mode (namely, SIB1 UL-DL configuration) or ii) a case where the TDD eIMTA PCell and the TDD (eIMTA or Non-eIMTA) SCell are subjected to CA and the TDD eIMTA PCell is operated in the non-fallback mode.

Method 4

When a TDD eIMTA PCell and an FDD SCell (i.e., FDD UL CC, FDD DL CC) are subjected to CA, and the TDD eIMTA PCell is operated in the fallback mode (i.e., SIB1 UL-DL configuration), validation of an A-SRS transmission-related triggering message in the FDD SCell may be determined based on at least one of Rule 4-A to Rule 4-F.

Method 4 used for cross carrier scheduling (CCS) or self-scheduling is described below.

Rule 4-A: validation of a triggering message may be determined depending on whether corresponding A-SRS transmission (on an FDD UL CC) needs to be performed at a point identical to a UL SF position according to at least one of i) DL HARQ reference configuration, ii) UL HARQ reference configuration, iii) SIB1 UL-DL configuration and iv) UL-reference HARQ timeline and v) DL-reference HARQ timeline of the TDD eIMTA PCell and/or vi) the UpPTS position.

Specifically, if A-SRS transmission (on the FDD UL CC) needs to be performed at a point identical to a UL SF position according to at least one of i) DL HARQ reference configuration, ii) UL HARQ reference configuration, iii) SIB1 UL-DL configuration, iv) UL-reference HARQ timeline, v) DL-reference HARQ timeline of the TDD eIMTA PCell and/or vi) the UpPTS position, the UE may determine that the corresponding triggering message is valid. On the other hand, if the point is not identical to any of the positions i) to vi), the UE may determine that the corresponding triggering message is invalid.

Rule 4-B: if A-SRS transmission (on the FDD UL CC) needs to be performed at a point identical to the UL SF position according to at least one of i) DL HARQ reference configuration, ii) UL HARQ reference configuration, iii) SIB1 UL-DL configuration, iv) UL-reference HARQ timeline, v) DL-reference HARQ timeline of the TDD eIMTA PCell and/or vi) the UpPTS position, the UE may determine that the corresponding triggering message is valid.

On the other hand, if A-SRS transmission (on the FDD UL CC) needs to be performed at a point different from the UL SF position according to at least one of i) DL HARQ reference configuration, ii) UL HARQ reference configuration, iii) SIB1 UL-DL configuration, iv) UL-reference HARQ timeline, v) DL-reference HARQ timeline of the TDD eIMTA PCell and/or vi) the UpPTS position, the UE may determine that the triggering message is valid only when PUSCH transmission and A-SRS transmission are scheduled at the same time (namely, only when a PUSCH and an A-SRS need to be transmitted simultaneously in one SF (on the FDD UL CC)). If PUSCH transmission and A-SRS transmission are not scheduled at the same time, the UE may determine that the triggering message is invalid.

Rule 4-C: the UE may determine that the triggering message is valid only when PUSCH transmission is scheduled in the same SF of the FDD UL CC in which the A-SRS transmission needs to be performed (namely, only when a PUSCH and an A-SRS need to be transmitted simultaneously in one SF (on the FDD UL CC)). On the other hand, if PUSCH transmission and A-SRS transmission are not scheduled at the same time, the UE may determine that the triggering message is invalid.

Rule 4-D: the UE may determine that the triggering message is (always) invalid and thus may not perform A-SRS transmission on the FDD UL CC.

Rule 4-E: the UE may determine that the triggering message is (always) valid and thus perform A-SRS transmission on the FDD UL CC.

Validation of an A-SRS transmission-related triggering message in the FDD SCell may be determined based on Rule 4-F when the TDD eIMTA PCell and FDD SCell (i.e., FDD UL CC, FDD DL CC) are subjected to CA, and the TDD eIMTA PCell is operated in the non-fallback mode (i.e., actual UL-DL configuration (or valid UL-DL configuration)).

Rule 4-F: if A-SRS transmission (on the FDD UL CC) needs to be performed at a point identical to a UL SF position according to i) actual UL-DL configuration, ii) DL HARQ reference configuration, iii) UL HARQ reference configuration, iv) SIB1 UL-DL configuration, v) UL-reference HARQ timeline, or vi) DL-reference HARQ timeline of the TDD eIMTA PCell and/or vii) the UpPTS position, the UE may determine that the corresponding triggering message is valid. On the other hand, if A-SRS transmission needs to be performed at a point different from the positions i) to vii), the UE may determine that the triggering message is invalid.

Hereinafter, a description will be given of a method for determining validation of periodic SRS (P-SRS) transmission when usage of a radio resource in a specific cell (i.e., eIMTA Cell) changes dynamically according to the state of load, and a UE fails to perform simultaneous TX and RX in the aggregated cells in a situation where CA is adopted.

For simplicity, it is assumed in the following description that two cells are subjected to CA. However, it is apparent to those skilled in the art that the present invention is also applicable to a situation where three or more cells are subjected to CA.

Method 5 disclosed below may be used in i) a case where a TDD eIMTA PCell and a TDD (eIMTA or Non-eIMTA) SCell are subjected to CA and the TDD eIMTA PCell is operated in the fallback mode (namely, SIB1 UL-DL configuration) or ii) a case where the TDD eIMTA PCell and the TDD (eIMTA or Non-eIMTA) SCell are subjected to CA and the TDD eIMTA PCell is operated in the non-fallback mode.

Method 5

When a TDD eIMTA PCell and an FDD SCell (i.e., FDD UL CC, FDD DL CC) are subjected to CA, and the TDD eIMTA PCell is operated in the fallback mode (i.e., SIB1 UL-DL configuration), validation of P-SRS transmission in the FDD SCell may be determined based on Rule 5-A to Rule 5-F.

Method 5 used for cross carrier scheduling (CCS) or self-scheduling is described below.

Rule 5-A: validation of P-SRS transmission may be determined depending on whether P-SRS transmission (on an FDD UL CC) needs to be performed at a point identical to a UL SF position according to at least one of i) DL HARQ reference configuration, ii) UL HARQ reference configuration, iii) SIB1 UL-DL configuration, iv) UL-reference HARQ timeline, or v) DL-reference HARQ timeline of the TDD eIMTA PCell and/or vi) the UpPTS position.

Specifically, if P-SRS transmission (on the FDD UL CC) needs to be performed at a point identical to a UL SF position according to at least one of i) DL HARQ reference configuration, ii) UL HARQ reference configuration, iii) SIB1 UL-DL configuration, iv) UL-reference HARQ timeline, or v) DL-reference HARQ timeline of the TDD eIMTA PCell and/or vi) the UpPTS position, the UE may determine that P-SRS transmission is valid. On the other hand, if P-SRS transmission needs to be performed at a point different from the positions i) to vi), the UE may determine that P-SRS transmission is invalid.

Rule 5-B: if P-SRS transmission (on the FDD UL CC) needs to be performed at a point identical to the UL SF position according to at least one of i) DL HARQ reference configuration, ii) UL HARQ reference configuration, iii) SIB1 UL-DL configuration, iv) UL-reference HARQ timeline, v) DL-reference HARQ timeline of the TDD eIMTA PCell and/or vi) the UpPTS position, the UE may determine that P-SRS transmission is valid.

On the other hand, if the P-SRS transmission needs to be performed at a point different from the UL SF position according to at least one of i) DL HARQ reference configuration, ii) UL HARQ reference configuration, iii) SIB1 UL-DL configuration, iv) UL-reference HARQ timeline, v) DL-reference HARQ timeline of the TDD eIMTA PCell and/or vi) the UpPTS position, the UE may determine that the P-SRS transmission is valid only when PUSCH transmission and the P-SRS transmission are scheduled at the same time (namely, only when a PUSCH and a P-SRS need to be transmitted simultaneously in one SF (on the FDD UL CC)). If PUSCH transmission and P-SRS transmission are not scheduled at the same time, the UE may determine that the P-SRS transmission is invalid.

Rule 5-C: the UE may determine that the triggering message is valid only when PUSCH transmission is scheduled in the same SF of the FDD UL CC in which the P-SRS transmission needs to be performed (namely, only when a PUSCH and a P-SRS need to be transmitted simultaneously in one SF (on the FDD UL CC)). On the other hand, if PUSCH transmission and P-SRS transmission are not scheduled at the same time, the UE may determine that the P-SRS transmission is invalid.

Rule 5-D: the UE may determine that P-SRS transmission is (always) invalid and thus may not perform P-SRS transmission on the FDD UL CC.

Rule 5-E: the UE may determine that P-SRS transmission is (always) valid and thus perform P-SRS transmission on the FDD UL CC.

Validation of P-SRS transmission in the FDD SCell may be determined based on Rule 5-F when the TDD eIMTA PCell and FDD SCell (i.e., FDD UL CC, FDD DL CC) are subjected to CA, and the TDD eIMTA PCell is operated in the non-fallback mode (i.e., actual UL-DL configuration (or valid UL-DL configuration)).

Rule 5-F: if P-SRS transmission (on the FDD UL CC) needs to be performed at a point identical to a UL SF position according to i) actual UL-DL configuration, ii) DL HARQ reference configuration, iii) UL HARQ reference configuration, iv) SIB1 UL-DL configuration, v) UL-reference HARQ timeline, or vi) DL-reference HARQ timeline of the TDD eIMTA PCell and/or vii) the UpPTS position, the UE may determine that the P-SRS transmission is valid. On the other hand, if P-SRS transmission needs to be performed at a point different from positions i) to vii), the UE may determine that the P-SRS transmission is invalid.

The proposed methods and corresponding embodiments/rules/configurations described above may be set to be applied only in at least one of i) a case where usage of a radio resource of at least one specific cell dynamically changes according to the state of load, ii) a case where a transmission mode (TM) of at least one specific cell is designated as a predefined TM, and iii) a case where a UL-DL configuration of at least one specific cell (e.g., TDD eIMTA Cell) is (re)set to a specific value.

It is apparent to those skilled in the art that the aforementioned proposed methods/embodiments/rules/configurations may be considered as embodiments since they may also be included in one of the implemented methods of the present invention. The proposed methods/embodiments/rules/configurations described herein may be independently implemented or a combination thereof may be implemented.

Further, a BS may deliver information on the aforementioned proposed methods/embodiments/rules/configurations or information on whether or not the proposed methods/embodiments/rules/configurations are adopted by the UE through a predefined signal (e.g., a physical layer signal or higher layer signal).

Further, the embodiments described above may be configured to be applied only when a TDD Cell and an FDD Cell are subjected to CA (as, for example, a TDD (eIMTA/Non-eIMTA) PCell and an FDD SCell or as an FDD PCell and a TDD (eIMTA/Non-eIMTA) SCell).

In addition, in a situation where CA is adopted, the proposed methods/embodiments/rules/configurations may be configured to be applied only when the primary cell (PCell) is prioritized over the secondary cell (SCell) (from the perspective of a UE (e.g., a half duplex UE) which cannot perform simultaneous TX and RX in the aggregated cells) in using a subframe.

Additionally, the proposed methods/embodiments/rules/configurations may be configured to be applied only to a UE which does not perform simultaneous TX and RX in aggregated cells to which CA is applied (and/or a half duplex UE).

Further, the proposed methods/embodiments/rules/configurations may also be applied when cells having different TDD UL-DL configurations (e.g., SIB1 UL-DL configuration (PCell) and RadioResourceConfigCommonSCell IE (SCell)) are subjected to CA, and usage of a radio resource for at least one of the cells dynamically changes according to the state of load.

Figure 12:
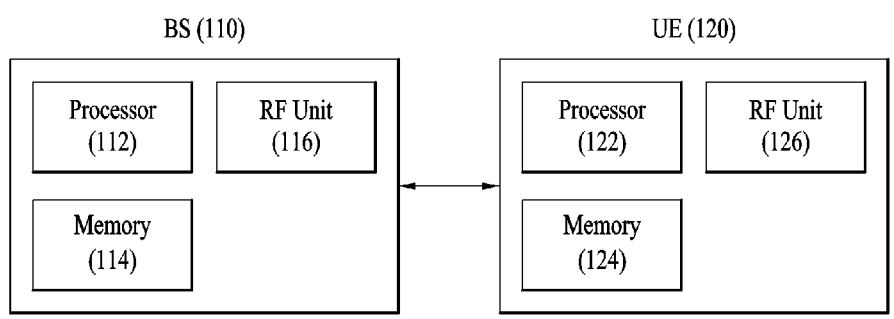
FIG. 12 illustrates a base station and a user equipment which are applicable to an embodiment of the present invention.

FIG. 12 illustrates a BS and UE which are applicable to an embodiment of the present invention.

If a wireless communication system includes a relay, communication on the backhaul link is performed between the BS and the relay, and application on an access link is performed between the relay and the UE. Accordingly, the BS or UE illustrated in the figure may be replaced by a relay according to a situation.

Referring to FIG. 12, a wireless communication system includes a BS 110 and a UE 120. The BS 110 includes a processor 112, a memory 114, and a radio frequency (RF) unit 116. The processor 112 may be configured to implement the procedures and/or methods proposed herein. The memory 114 is connected to the processor 112 and stores various kinds of information related to operation of the processor 112. The RF unit 116 is connected to the processor 112 and transmits and/or receives a radio signal. The UE 120 includes a processor 122, a memory 124, and an RF unit 126. The processor 122 may be configured to implement procedures and/or methods proposed herein. The memory 124 is connected to the processor 122 and stores various kinds of information related to operation of the processor 122. They RF unit 126 is connected to the processor 122 and transmits and/or receives a radio signal. The BS 110 and/or the UE 120 may have a single antenna or multiple antennas.

The embodiments described above are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The ordering of the operations discussed in the embodiments of the present invention may be changed. Some elements or features of one embodiment may also be included in another embodiment, or may be replaced by corresponding elements or features of another embodiment. It is apparent that claims that are not explicitly cited in each other in the appended claims may be presented in combination as an embodiment of the present invention or included as a new claim by subsequent amendment after the application is filed.

In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term "BS" may be replaced with the terms "fixed station", "Node B", "eNode B (eNB)", "Access Point (AP)", etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, or the like.

When implemented by firmware or software, an embodiment of the present invention may be embodied as a module, a procedure, or a function that performs the functions or operations described above. Software code may be stored in a memory unit and executed by a processor.

The memory unit is located at the interior or exterior of the processor and may transmit and receive data to and from the processor via various known means.

The present invention may be carried out in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for determining validation of a signal in a wireless communication system supporting reconfiguration of a radio resource and apparatus therefore have been described above focusing on exemplary application thereof to a 3GPP LTE system. However, the method and apparatus may also be applied to various wireless communication systems other than the 3GPP LTE system.

The invention claimed is:

1. A method for receiving a signal by a user equipment (UE) configured to support simultaneous reception and transmission of aggregated cells in a wireless communication system supporting carrier aggregation and reconfiguration of a radio resource, the method comprising:
   receiving, on a radio resource, in which a special subframe of a primary cell, based on a first uplink-downlink configuration, overlaps a downlink subframe of a secondary cell, downlink control information about the secondary cell, wherein the special subframe includes a Downlink Pilot Time Slot (DwPTS), Guard Period (GP) and Uplink Pilot Time Slot (UpPTS);
   monitoring a reconfiguration message for configuring a second uplink-downlink configuration of the primary cell; and
   determining whether the downlink control information is valid based on the first and the second uplink-downlink configuration of the primary cell,
   wherein, when the radio resource is a subframe identified as a downlink subframe by the second uplink-downlink configuration and as a special subframe by the first uplink-downlink configuration, the downlink control information is determined to be valid, and
   wherein the first uplink-downlink configuration is configured by a system information block (SIB) and the second uplink-downlink configuration is configured by a reconfiguration message.

2. The method according to claim 1, further comprising:
   receiving, when the downlink control information is determined to be valid, a physical downlink shared channel (PDSCH) on the radio resource.

3. The method according to claim 1, wherein validation is performed only when a special subframe configuration of the first uplink-downlink configuration is a plurality of configurations for the special subframe.

4. The method according to claim 1, further comprising:
   transmitting, when the downlink control information is valid, a Physical Uplink Shared Channel (PUSCH) on the uplink subframe indicated by an uplink grant included in the downlink control information.

5. A user equipment (UE) configured not to support simultaneous reception and transmission of aggregated cells in a wireless communication system supporting carrier aggregation and reconfiguration of a radio resource, the UE comprising:
   a transmitter and a receiver; and
   a processor, operatively coupled to the transmitter and receiver, that:

controls the receiver to receive, on a radio resource, in which a special subframe of a primary cell, based on a first uplink-downlink configuration, overlaps a downlink subframe of a secondary cell, downlink control information about the secondary cell, wherein the special subframe includes a Downlink Pilot Time Slot (DwPTS), Guard Period (GP) and Uplink Pilot Time Slot (UpPTS);

monitors a reconfiguration message for configuring a second uplink-downlink configuration of the primary cell; and determines whether the downlink control information is valid based on the first and the second uplink-downlink configuration of the primary cell, wherein, when the radio resource is a subframe identified as a downlink subframe by the second uplink-downlink configuration and as a special subframe by the first uplink-downlink configuration, the downlink control information is determined to be valid, and wherein the first uplink-downlink configuration is configured by a system information block (SIB) and the second uplink-downlink configuration is configured by a reconfiguration message.

6. A method for transmitting a signal by a user equipment (UE) configured not to support simultaneous reception and transmission of aggregated cells in a wireless communication system supporting carrier aggregation and reconfiguration of a radio resource, the method comprising:

receiving a sounding reference signal (SRS) triggering message for a secondary cell on a radio resource, in which a special subframe of a primary cell based on a first uplink-downlink configuration, overlaps a downlink subframe of the secondary cell, wherein the special subframe includes a Downlink Pilot Time Slot (DwPTS), Guard Period (GP) and Uplink Pilot Time Slot (UpPTS);

monitoring a reconfiguration message for configuring a second uplink-downlink configuration of the primary cell; and determining whether the SRS triggering message is valid based on the first and the second uplink-downlink configuration of the primary cell, wherein, when the radio resource is a subframe identified as a downlink subframe by the second uplink-downlink configuration and as a special subframe by the first uplink-downlink configuration, the SRS triggering message is determined to be valid, and wherein the first uplink-downlink configuration is configured by a system information block (SIB) and the second uplink-downlink configuration is configured by a reconfiguration message.

7. The method according to claim 6, wherein the SRS triggering message is determined to be valid when a Physical Uplink Shared Channel (PUSCH) and the SRS are scheduled simultaneously on the radio resource.

* * * * *